(12) United States Patent
Breitenberger

(10) Patent No.: US 6,182,638 B1
(45) Date of Patent: Feb. 6, 2001

(54) INTERNAL COMBUSTION ENGINE WITH INLET AND OUTLET VALVES

(75) Inventor: Manfred Breitenberger, Graz (AT)

(73) Assignee: Deutz AG, Cologne (DE)

( * ) Notice: Under 35 U.S.C. 154(b), the term of this patent shall be extended for 0 days.

(21) Appl. No.: 09/380,809

(22) PCT Filed: Apr. 8, 1998

(86) PCT No.: PCT/EP98/02032

§ 371 Date: Sep. 8, 1999

§ 102(e) Date: Sep. 8, 1999

(87) PCT Pub. No.: WO98/45593

PCT Pub. Date: Oct. 15, 1998

(30) Foreign Application Priority Data

Apr. 9, 1997 (AT) ........................................................ 607/97

(51) Int. Cl.[7] .................................................. F02M 55/02
(52) U.S. Cl. ........................................... 123/468; 123/470
(58) Field of Search ..................................... 123/468, 469, 123/470

(56) References Cited

U.S. PATENT DOCUMENTS

| | | | |
|---|---|---|---|
| 3,125,078 | 3/1964 | Reiners | 123/470 |
| 3,402,703 | * 9/1968 | Dickerson et al. | 123/469 |
| 3,431,895 | * 3/1969 | Bailey | 123/470 |
| 3,845,748 | 11/1974 | Eisenberg | 123/470 |
| 3,924,583 | * 12/1975 | Jardin | 123/470 |
| 4,384,557 | * 5/1983 | Johnson | 123/468 |
| 4,485,790 | 12/1984 | Nishimura | 123/468 |
| 5,775,303 | * 7/1998 | Sweetland et al. | 123/509 |

FOREIGN PATENT DOCUMENTS

| | | |
|---|---|---|
| 382 429 | 2/1987 | (AT) . |
| WO 95/24551 | 9/1995 | (EP) . |

* cited by examiner

Primary Examiner—Thomas N. Moulis
(74) Attorney, Agent, or Firm—Charles L. Schwab; Hardaway/Mann IP Group

(57) ABSTRACT

This invention relates to an internal combustion engine with intake and exhaust valves (6, 7) and one nozzle mount (4) per cylinder (2) for an injection nozzle (5) injecting fuel into a combustion chamber, the nozzle mount being connected to a fuel supply line (14) and a return oil line (19), the nozzle mount (1) being screwed into a first recess (13) in the cylinder head (1), and the cylinder head (1) exhibiting a second recess (17) approximately normal to an engine longitudinal plane (16) containing the cylinder axis (3), which second recess, extending from a first cylinder head longitudinal side wall (15a), intersects the first recess (13) approximately radially. In order to make possible a reliable fuel supply to the nozzle mount (4) with minimal space requirement and short fuel supply lines (14), the second recess (17) continues up to the second cylinder head longitudinal side wall (15b) lying opposite the first cylinder head longitudinal side wall (15a) and forms in this region the return oil drain.

11 Claims, 1 Drawing Sheet

INTERNAL COMBUSTION ENGINE WITH INLET AND OUTLET VALVES

This invention relates to an internal combustion engine with intake valves and exhaust valves and, for each cylinder, one nozzle mount connected to a fuel supply line and an overflow oil line for an injection nozzle injecting fuel into a combustion chamber, the nozzle mount being inserted in a first recess of the cylinder head and the cylinder head exhibiting, approximately normally to an engine longitudinal plane containing the cylinder axis, a second recess, which, starting from a first cylinder head longitudinal side wall, strikes the first recess approximately radially.

In internal combustion engines of the type stated at the outset, there is scarcely any free space for the arrangement of the fuel supply line fur the central injection nozzle, especially when there are six cylinder head bolts surrounding one cylinder each and four valves per cylinder. In order to keep the fuel supply line between a cam-actuated screw-in pump and the injection nozzle as short as possible, feeding into the cylinder head on a cylinder head longitudinal side is desirable. The space required therefor is, however, often already occupied by push rods, breathing ducts, cylinder head bolts or the like.

U.S. Pat. No. 3,845,748 A shows such a lateral supply of fuel. Any escaping fuel is returned to an overflow oil bore via a slot between the supply bore and the fuel line. Such a solution is, however, costly and, because of a large number of seals, susceptible to malfunctions.

It is an object of the present invention to find, for an internal combustion engine of the type stated at the outset, a fuel supply line arrangement, favorable in terms of installation and maintenance as well as reliable and space-saving, for a lateral fuel supply.

According to the invention, this object is achieved by virtue of the fact that the second recess continues up to the second cylinder head longitudinal side wall lying opposite the first cylinder head longitudinal side wall and forms the overflow oil drain in this region. This makes possible, on the one hand, very simple fabrication and, on the other hand, simple installation and removal.

The recess for the overflow oil drain preferably opens into an overflow oil line running in the engine longitudinal direction.

An especially favorable design, particularly with respect to thermal stresses, is achieved by virtue of the fact that the fuel supply line is led in the second recess from the first cylinder head longitudinal side wall up to a radial inlet port of the nozzle mount, preferably being clamped in place by a thrust piece made in the form of a hollow screw and screwed into the second recess.

The thrust piece is preferably screwed into the cylinder head about halfway between the first cylinder head longitudinal side wall and the nozzle mount and is sealed off from the cylinder head between the threaded connector and the nozzle mount by a seal, preferably an O-ring seal, the sealed-off overflow oil slot formed by the thrust piece and the cylinder head being in flow connection to the overflow oil line. Further, there can be an additional O-ring seal in the region of the first cylinder head longitudinal side wall to seal the thrust piece off from the cylinder head. In this way, reliable sealing of the thrust piece and the fuel supply line is achieved, any fuel that may leak into the nozzle mount in the opening region of the fuel supply line being fed into the overflow oil system.

In an especially preferred development of the invention, the axis of the second recess, in the region between the threaded connector and the first cylinder head longitudinal side wall, intersects the axis of a cylinder head bolt hole formed into the cylinder head between the thrust piece and the cylinder head gasket surface. During assembly, the cylinder head bolt is first screwed into this cylinder head bolt hole, and then the fuel supply line can be connected to the thrust piece on the nozzle mount. In this way, the bearing surface of the cylinder head bolt hole for the head surface of the cylinder head bolt is sunk under the second recess.

The invention is explained in more detail on the basis of the Figures.

Figure 1:
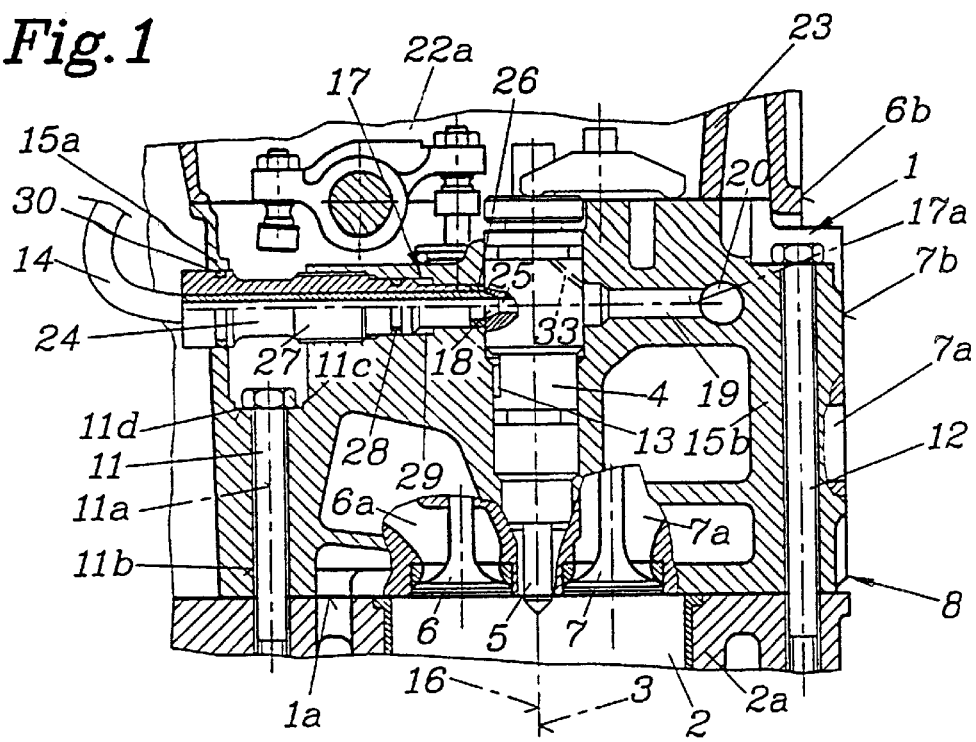
FIG. 1 shows a cross section through the cylinder head according to the invention along line I—I in FIG. 2.

The cylinder head 1 exhibits, for each cylinder 2, a nozzle mount 4 arranged in the region of the cylinder axis 3 for an injection nozzle 5 opening centrally into the cylinder 2, as well as two intake valves 6 and two exhaust valves 7 per cylinder 2. Intake ducts 6a or exhaust ducts 7a, which issue from flange surfaces 6b or 7b, respectively, on the same longitudinal side 8 of the internal combustion engine, open to the intake valves 6 or exhaust valves 7, respectively. Two cylinder head bolts 11, 12 enclosing the cylinder 2 are arranged in each of two locations: in the region of engine transverse planes 9 to either side of each cylinder 2 and in an engine transverse plane 10 running through the cylinder axis 3.

The nozzle mount 4 is screwed into the cylinder head 1 in a first recess 13 coaxially with the cylinder axis 3. Access to the nozzle mount 4 is effected by a fuel supply line 14, which opens into the cylinder head 1 via the first cylinder head longitudinal side wall 15a lying opposite the intake flange surfaces 6b and exhaust flange surfaces 7b. The fuel supply line 14 is led through a second recess 17 arranged normally to the engine longitudinal plane 16, in the transverse plane 10, to a radial inlet port 25 of the nozzle mount 4. The opening of the fuel supply line 14 is identified by the number 18.

The second recess 17, starting from the cylinder head longitudinal side wall 15a, runs normally to the first recess 13, crosses said first recess radially, continues diametrically to the opening 18 into the first recess 13 on the other side of the engine longitudinal plane 16 in the cylinder head 1 as recess 19 for the overflow oil drain, and finally opens into an overflow oil line 20 in the region of the second cylinder head longitudinal side wall 15b. The fuel supply line 14 is fed by a screw-in pump, not shown in more detail, which is actuated via a cam, not further shown, of a camshaft. The cylinder head 1 is closed off above by a rocker-arm housing, identified by reference number 23, which accommodates a valve operating mechanism, not shown in more detail, the intake flange surface 6b being formed by the rocker-arm housing 23.

The opening 18 of the fuel supply line 14 is pressed against the inlet port 25 of the nozzle mount 4 by a thrust piece 24, made in the form of a hollow screw, which is screwed into the second recess 17. The thrust piece 24 exhibits an annular elastic pressure element 26. Between the threaded connector 27, which is arranged about halfway between the first cylinder head longitudinal side wall 15a and the nozzle mount 4, and the pressure element 26, there is an O-ring seal 28 for sealing the thrust piece 24 off from the cylinder head 1. If there is a leak of fuel between the opening 18 and the inlet port 25 of the nozzle mount 4 and fuel gets into the overflow oil slot 29 between thrust piece 24 and cylinder head 1, further penetration into the valve operating compartment 22a is blocked by the O-ring seal 28.

The overflow oil slot 29 is connected to the overflow oil duct 19, so that the leaked liquid can be returned to the overflow oil system via the overflow oil line 20. The reference number 33 identifies an overflow oil escape port of the nozzle mount 4, which is connected to the recess 19 for the overflow oil drain.

As FIG. 1 shows, the thrust piece 24 is arranged over the bearing surface 11c of a cylinder head bolt hole 11b for the head surface lid of a cylinder head bolt 11, the axis 11a of which cylinder head bolt intersects the axis 17a of the second recess 17. The cylinder head bolt 11 lying under the thrust piece 24 is made shorter than the other cylinder head bolts 12. Naturally, actuation of the cylinder head bolt 11 is possible only when the thrust piece 24 is removed. The installation and removal of the thrust piece 24 in the cylinder head 1 and its reliable sealing off is, however, possible in a problem-free manner by virtue of the design described.

In the region of the first cylinder head longitudinal side wall 15a, there is a further seal 30 between thrust piece 24 and cylinder head 1, which further seal seals the operating space 22a off from the surroundings.

Figure 2:
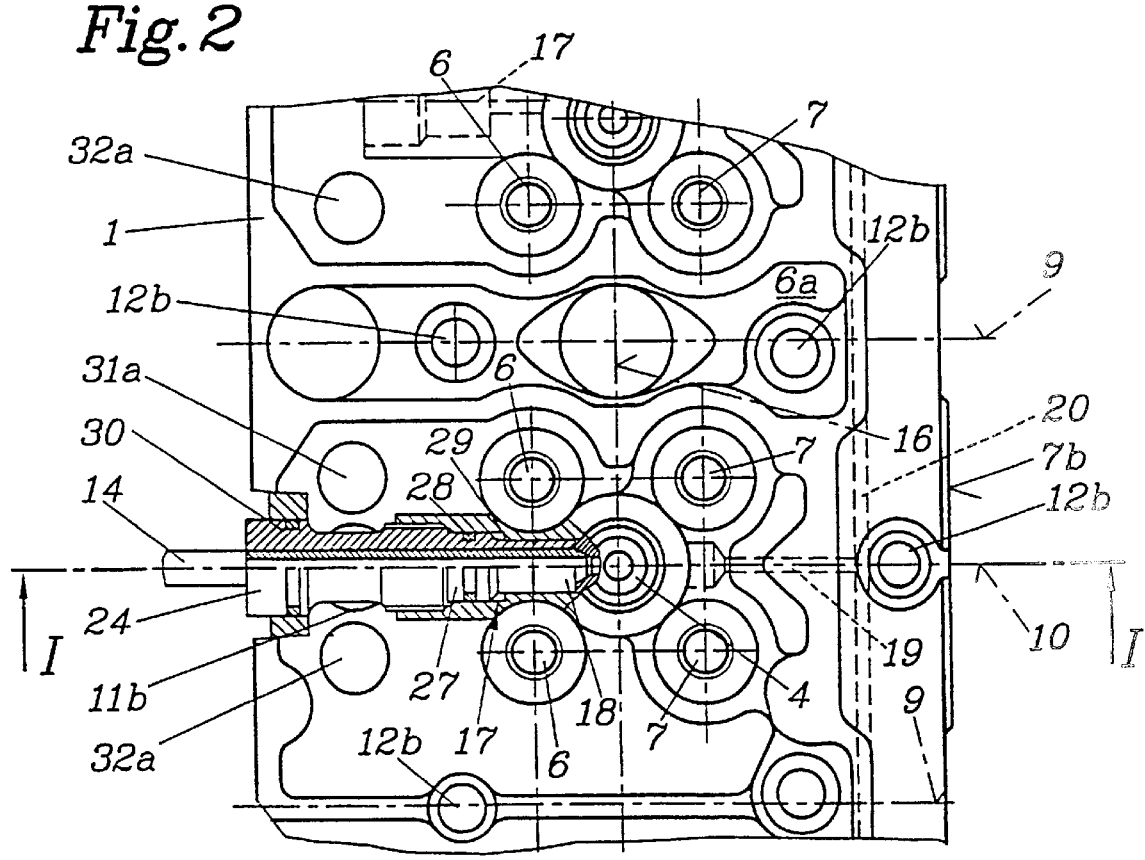
FIG. 2 shows a top view of the cylinder head.

As FIG. 2 shows, the thrust piece 24 with fuel supply line 14 is arranged between the bores 31a and 32a for push rods, not further shown, as well as between the two intake valves 6 over the cylinder head bolt 11 in the engine transverse plane 10 in the cylinder head 1. In this way, optimal utilization of the available free space and thus a very compact design of the cylinder head 1 is possible with extremely short fuel supply lines 14.

What is claimed is:

1. An internal combustion engine comprising:
   a crankcase (2a) including a plurality of parallel cylinders (2) whose axes (3) define an engine longitudinal plane (16),
   a cylinder head (1) secured to said crankcase (2a) in covering relation to said cylinders (2) including
   lateral opposite longitudinal side walls (15a, 15b);
   an injection nozzle holder bore (13) for each cylinder (2),
   an injection nozzle holder (4) in each nozzle holder bore (13)
   a fuel line bore (17) formed in said cylinder head (1) normal to said nozzle holder bore (13) and said engine longitudinal plane (16), said fuel line bore (17) extending from one of said longitudinal side walls to one side of said nozzle holder bore (13) thereby forming an opening for a fuel line to said injection nozzle holder and
   an overflow fuel drain passage (19) extending from the side of said nozzle holder bore (13) diametrically opposite to said one side and in alignment with said fuel line bore (17).

2. The internal combustion engine of claim 1 and further comprising a cylinder head bolt hole (11b) formed in said cylinder head (1) on an axis (11a) intersecting the axis (17a) of said fuel line bore (17).

3. The internal combustion engine of claim 1 and further comprising an overflow fuel conduit (20) extending along said other longitudinal side wall (15b), said overflow drain passage (19) connecting to said overflow fuel conduit (20).

4. The internal combustion engine of claim 3 wherein said nozzle holder (4) includes a radial inlet port (25) and further comprising a fuel line (14) disposed in said fuel line bore (17) and connected to said radial inlet port (25).

5. The internal combustion engine of claim 1 wherein said nozzle holder (4) includes a radial port (25) and further comprising a fuel line (14) disposed in said fuel line bore (17) and connected to said radial inlet port (25).

6. The internal combustion engine of claim 5 wherein said fuel line bore (17) includes a threaded part and further comprising a thrust sleeve (24) having a threaded portion (27) in threaded engagement with said threaded part, said thrust sleeve (24) being in thrust engagement with said fuel line (14) whereby said duel line (14) is held in thrust transmitting engagement with said radial inlet port (25) of said nozzle holder (4).

7. The internal combustion engine of claim 6, wherein said threaded part of said fuel line bore (17) is approximately midway between said one longitudinal side wall (15a) of said cylinder head (1) and said nozzle holder (4).

8. The internal combustion engine of claim 6 and further comprising a first O-ring seal (28) sealing said thrust sleeve (24) in relation to said cylinder head (1) between said threaded portion (27) and said nozzle holder (4) thereby defining a sealed off overflow fuel slot (29) between said thrust sleeve (24) and said cylinder head (1), said overflow fuel slot (29) being in fluid communication with said overflow fuel drain passage (19).

9. The internal combustion engine of claim 7 and further comprising a second O-ring seal between said thrust sleeve (24) and said cylinder head (1) at said one cylinder head longitudinal side wall (15a).

10. The internal combustion engine of claim 7 wherein said cylinder head (1) includes a cylinder head gasket surface (1a) and further comprising a cylinder head bolt hole (11b) in said cylinder head (1) extending to said cylinder head gasket surface (1a), the axis (11a) of said cylinder head bolt hole (11b) intersecting the axis (17a) of said fuel line bore (17).

11. An internal combustion engine comprising:
    a crankcase (2a) including a plurality of parallel cylinders (2) whose axes (3) define an engine longitudinal plane (16),
    a cylinder head (1) secured to said crankcase (2a) in covering relation to said cylinder (2) including
    laterally opposite longitudinal side walls (15a, 15b),
    a head gasket surface (1a) at its bottom,
    a central part including an injection nozzle holder bore (13) for each cylinder (2) extending from the top of said cylinder head to said head gasket surface,
    an upwardly open cavity extending downwardly from its top between one of said longitudinal side walls (15a, 15b) and said central part,
    an injection nozzle holder (4) in each nozzle holder bore (13) including a radial port (25),
    a fuel line bore (17) formed in said cylinder head (1) normal to said nozzle holder bore (13) and said engine longitudinal plane (16), said fuel line bore (17) having a first segment extending through said one longitudinal side wall and a second segment extending into said central part to one side of said nozzle holder bore (13), said fuel line bore in said central part including a threaded part, a fuel line (14) extending through said fuel line bore and connected to said radial port (25), a thrust sleeve (24) extending (22) through said first segment of said fuel line bore (17), across said cavity and into said second segment of said fuel line bore (17), said thrust sleeve (24) including a threaded portion (27) in threaded engagement with said threaded part, said thrust sleeve (24) being in thrust transmitting engagement with said fuel line (14) whereby said fuel line (14) is held in thrust transmitting engagement with said radial inlet port (25) of said nozzle holder (4) and, a cylinder head bolt hole (11*b*) extending from the bottom of said cavity to said cylinder head gasket surface (1*a*), said cylinder head bolt hole (11*b*) being vertically spaced directly below said thrust sleeve (24).

\* \* \* \* \*